United States Patent [19]

Nose

[11] Patent Number: 5,742,338
[45] Date of Patent: Apr. 21, 1998

[54] DEVICE FOR MEASURING ECCENTRICITIES OF ELECTRON BEAMS OF A COLOR CATHODE RAY TUBE BASED UPON LUMINANCE PATTERN IN MAGNETICALLY NEUTRAL ENVIROMENT

[75] Inventor: Tadashi Nose, Shiga, Japan

[73] Assignee: NEC Corporation, Japan

[21] Appl. No.: 592,265

[22] Filed: Jan. 26, 1996

[30] Foreign Application Priority Data

Jan. 31, 1995 [JP] Japan .................................. 7-013895

[51] Int. Cl.[6] .................................. H04N 17/00
[52] U.S. Cl. .................................. 348/190; 348/807
[58] Field of Search .................................. 348/190, 191, 348/180, 807, 380, 177

[56] References Cited

U.S. PATENT DOCUMENTS

| | | | |
|---|---|---|---|
| 4,642,529 | 2/1987 | Penn | 348/807 |
| 4,680,510 | 7/1987 | Spieth et al. | 348/807 |
| 4,814,858 | 3/1989 | Mochizuki et al. | 348/190 |
| 5,216,504 | 6/1993 | Webb et al. | 348/190 |

FOREIGN PATENT DOCUMENTS 6139940   5/1994   Japan .

*Primary Examiner*—Victor R. Kostak
*Attorney, Agent, or Firm*—Hayes, Soloway, Hennessey, Grossman & Hage, P.C.

[57] ABSTRACT

A device is provided for measuring eccentricities of electron beams of a color cathode ray tube. The device detects, in a magnetically neutral environment, by use of a luminance pattern formed on the screen of the tube, eccentricities of electron beams, ascribable to electron gun electrode port production and assembly errors. The device has rapid measuring capabilities and may be used on a production line.

3 Claims, 2 Drawing Sheets

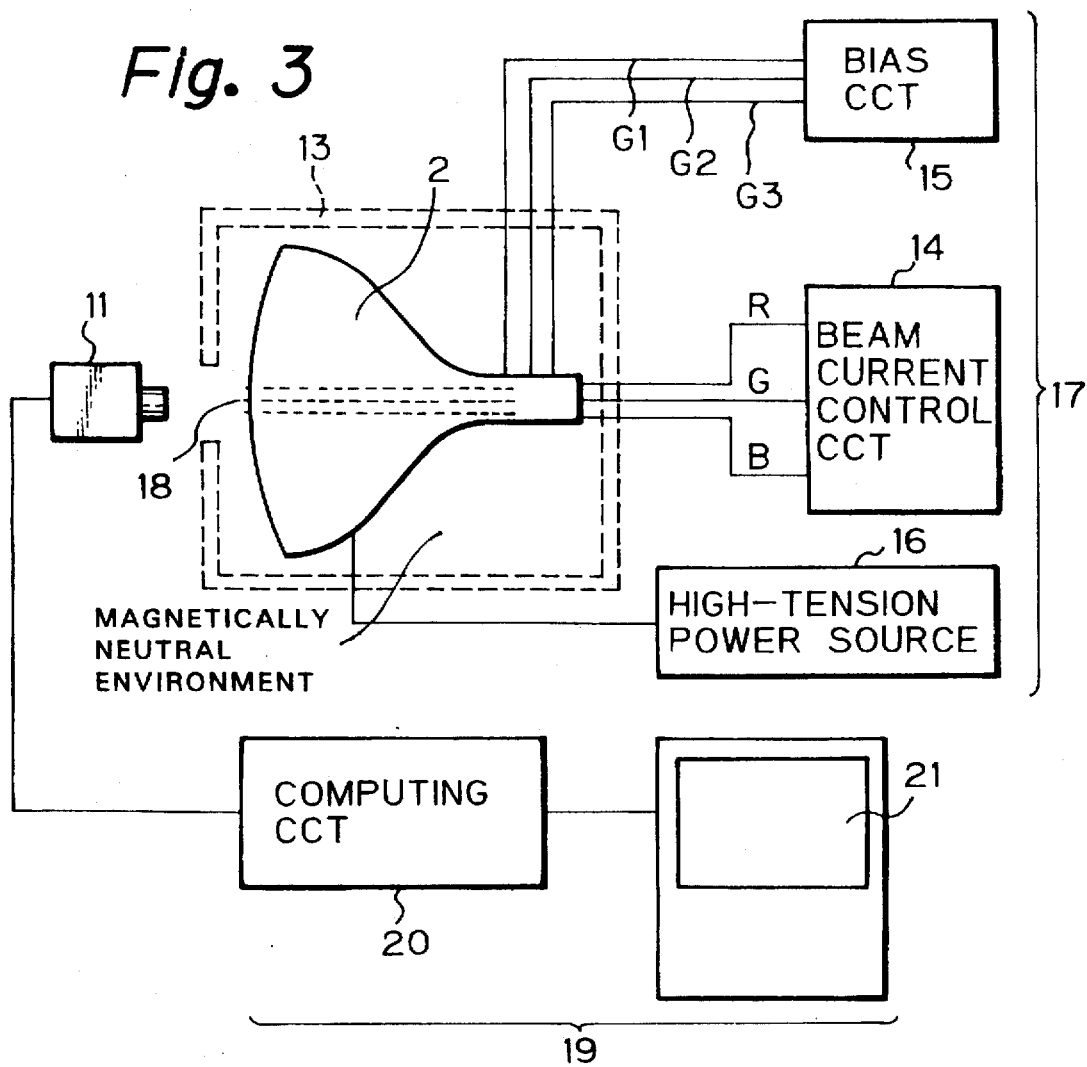

DEVICE FOR MEASURING ECCENTRICITIES OF ELECTRON BEAMS OF A COLOR CATHODE RAY TUBE BASED UPON LUMINANCE PATTERN IN MAGNETICALLY NEUTRAL ENVIROMENT

BACKGROUND OF THE INVENTION

The present invention relates to a device for measuring the eccentricities of electron beams of a color cathode ray tube and, more particularly, to an eccentricity measuring device for providing advance data useful for a procedure which adjusts, by combining a deflection yoke and convergence purity adjustment magnet, the outside magnetic field in order to optimize WU (White Uniformity), BU (Brightness Uniformity), and convergence As used herein, this kind of procedure will be referred to as an ITC (Integrated Tube Component) procedure or stage.

Generally, the image quality of a color cathode ray tube is not accurately adjustable by simple mechanical positioning due to production errors affecting the tube and deflection yoke. In light of this, it has been customary to adjust the image quality at the central part of the screen by use of a convergence purity adjustment magnet, and to adjust it at the peripheral part by adjusting the position of the deflection yoke in the axial direction of the tube. However, to enhance adjustment accuracy of the entire screen, it is necessary to effect correction using, e.g., magnetic pieces, magnets, etc. This kind of correction is time-consuming and slows the ITC stage.

As for the positioning of the tube and yoke, it is generally accepted that it is ideal that the center of exposure at the time when the fluorescent screen of the tube is formed, and the center of deflection of the yoke be aligned, and that the electron beam axis passing through the center of exposure and the axis of the magnetic field of the yoke be aligned. In practice, however, the center of exposure and/or the electron beam axis are eccentric, and the electron beam axis is inclined, due to errors in the production of the tube. On the other hand, for the yoke, final adjustment is effected by use of, e.g., a magnetic ferrite sheet and a reference cathode ray tube in which electron beams are free from eccentricity at the neck portion of the tube. The final adjustment causes the center of exposure and the center of deflection to be aligned with each other, and causes the electron beam axis and the axis of magnetic field be aligned with each other.

Therefore, if the electron beams of the tube have their eccentric positions measured prior to the ITC stage, ITC can be readily performed by combining, based on the resulting data, the tube with a deflection yoke having an axis of magnetic field that is eccentric by the same amount as the electron beams. Japanese Laid-Open Patent Publication No. 6-139940 discloses a device for measuring the eccentricities of electron beams. However, this prior art device has a complicated arrangement including a movable unit, and takes a long period of time to accomplish measurement. As a result, it is impossible to increase the index of the production line.

SUMMARY OF THE INVENTION

It is therefore an object of the present invention to provide a device capable of measuring, in a magnetically neutral environment, the eccentric positions of electron beams rapidly and accurately on the basis of a luminance point pattern of tricolor electron beam spots formed at the center of a screen, and in addition, that includes no movable portions.

A device for measuring the eccentricities of tricolor electron beams of a color cathode ray tube of the present invention has a controller for controlling each of tricolor electron beam currents of the cathode ray tube so as to cause the beam currents to have a current which does not damage the fluorescent screen of the cathode ray tube. A video camera detects a luminance pattern resulting from the impingement of the tricolor electron beams on the fluorescent screen. An processing section processes the image luminance pattern detected by the camera to thereby determine the eccentricities and eccentric positions of the electron beams. As a result, the eccentricities of the electron beams are measured on the basis of the luminance pattern in a magnetically neutral environment.

BRIEF DESCRIPTION OF THE DRAWINGS

The above and other objects, features and advantages of the present invention will become more apparent from the following detailed description taken with the accompanying drawings in which:

FIG. 3 shows a device for measuring the eccentricities of electron beams; which device embodies the present invention; and FIG. 4 shows specific results of measurement appearing on a display included in the embodiment of FIG. 3.

DESCRIPTION OF THE PREFERRED EMBODIMENT

Figure 1:
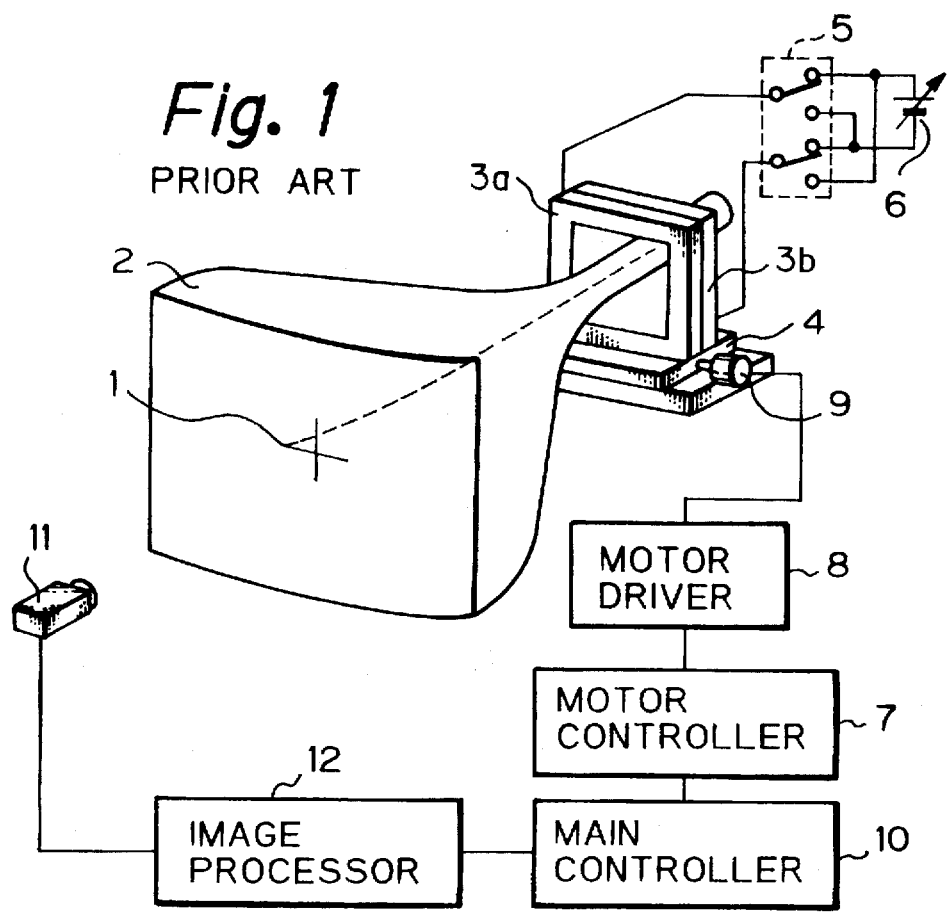
FIG. 1 shows a conventional device for measuring the eccentricities of electron beams.

Referring to FIG. 1 of the drawings, a conventional device for measuring the eccentricities of electron beams and taught in Japanese Patent Laid-Open Publication No. 6-139940 mentioned earlier will be described. As shown, an electron beam spot 1 to be measured is driven by an ordinary drive power source, not shown, and causes the screen of a color cathode ray tube 2 to glow. A pair of solenoid coils 3a and 3b form a vertical DC magnetic field acting on the neck portion of the tube 2. The coils 3a and 3b are connected in series and mounted on a frame 4 in order to reduce the influence of leakage magnetic field. A DC power source 6 is connected to the coils 3a and 3b via a switch 5. In this configuration, forward and reverse DC currents are selectively applied from the power source 6 to the coils 3a and 3b via the switch 5.

The frame 4 is movable in the horizontal direction by being driven by a motor 9. A main controller 10 drives the motor 9 via motor controller 7 and motor driver 8 until the frame 4 reaches a desired position. A video camera 11 images the screen of the tube 2 in order to detect the luminance pattern generated on the screen. The output from the camera 11 is processed by an image processor 12 and then applied to the main controller 10. In response, the main controller 10 detects the position of the beam spot 1 as the center of gravity of the luminance pattern.

Figure 2:
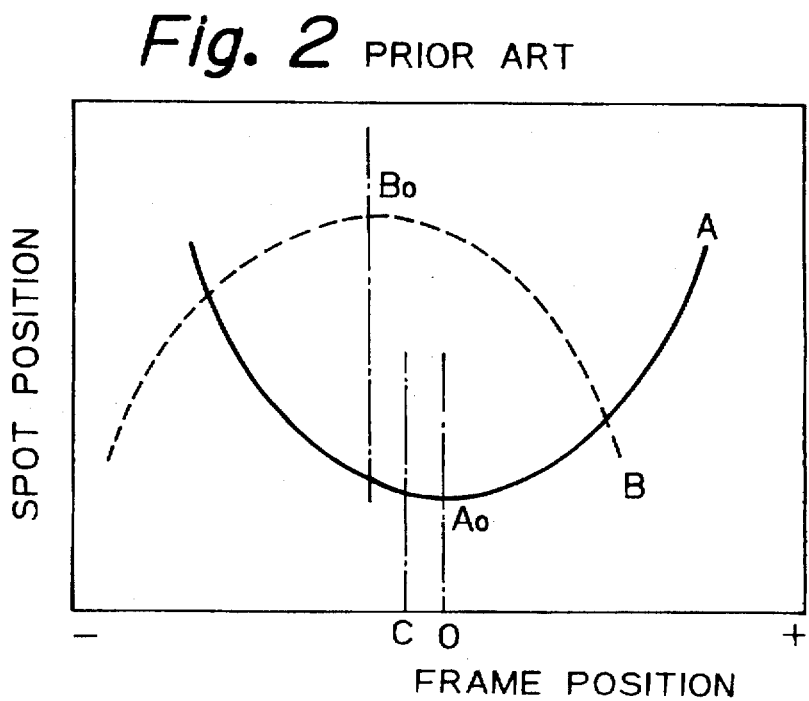
FIG. 2 shows curves representative of a measuring method particular to the conventional device of FIG. 1.

The position of frame 4 where coils 3a and 3b are located at the center of the neck portion of the tube 2 is predetermined to be a point zero. As shown in FIG. 2, when the frame 4 is moved in the right-and-left directions away from the point zero, apexes A0 and B0 are deviated from each other due to the field strength distribution set up by the coils 3a and 3b. However, if repetition accuracy is less than 0.01 mm, the mean position C of the apexes A0 and B0 can be determined to be the eccentric position of the beam in the horizontal direction. An eccentric position in the vertical direction can be determined in the same manner if the frame 4 is rotated 90 degrees about the neck portion of the tube 2.

As stated above, the conventional device moves the coils 3a and 3b repeatedly and, in addition, changes the polarity of the electric field. This kind of device has a complicated configuration including a movable unit, and takes a long time to accomplish measurement. As a result, it is impossible to increase efficiency of the production line.

Reference will be made to FIGS. 3 and 4 for describing a beam eccentricity measuring device embodying the present invention. In FIG. 3, the same or similar elements as or to the elements shown in FIG. 1 are designated by the same reference numerals, and a detailed description thereof will not be made in order to avoid redundancy. As shown in FIG. 3, the measuring device has a magnetic shield 13 in which a color cathode ray tube 2 is positioned. A shadow mask, not shown, and other magnetic parts built in the tube 2 are demagnetized beforehand. Drive circuitry 17 is made up of a beam current control circuit 14, a bias circuit 15, and a high-tension power source 16. Tricolor, i.e., R (red), G (green) and B (Blue) electron beams are controlled so as to have a beam current which is about 10% of a rated beam current by the drive circuitry 17 and impinge on the screen of the tube 2, forming a luminance pattern 18 of tricolor beam spots.

A video camera 11 detects the luminance pattern 18. An image processing section 19 is made up of a computing circuit 20 and a display 21. The computing circuit 20 detects, based on the output of the computing circuit 20, the centers of the individual beam spots included in the luminance pattern 18 as a center of gravity of luminance. As shown in FIG. 4, the display 21 shows the deviations of R, G and B from preselected positions in the horizontal direction ($\Delta x$), vertical direction ($\Delta y$), and rotation direction ($\Delta \theta$), together with the results of evaluation using reference or rated values.

With the above embodiment, it is possible to measure the eccentric position of each electron beam of the tube 2 easily. The ITC procedure can be readily executed by combining the results of measurement and a deflection yoke matching the tube. In addition, because tubes in which the deviations exceed the adjustable limit are excluded previously at the ITC stage, production efficiency is enhanced.

In summary, in accordance with the present invention, it is possible to detect, in a magnetically neutral measurement environment and by use of a luminance pattern formed on the screen of a color cathode ray tube, the eccentricities of electron beams ascribable to production errors of electrode parts included in the electron gun of the tube and to the assembly errors of the gun on the tube without any magnetic influence. Hence, the present invention implements a measuring device having rapid measuring capabilities and maybe used for measurement on a production line.

Further, the present invention shows on a display whether or not the measured values are acceptable with respect to reference or rated values. This prevents tubes whose eccentricities exceed an adjustable limit from being introduced into an ITC stage.

Various modifications will be apparent to those skilled in the art after receiving the teachings of the present disclosure without departing from the scope thereof. For example, although the preferred embodiment uses the drive circuitry 17 for controlling the beam current so that the beam current is about 10% of the rated current, and uses the display 21 to show the eccentricities of the individual electron, any desired beam current may be selected on the basis of relation between the measuring time (dependent on the processing time) and the luminance of the beam spot, so long as the beam current does not damage the fluorescent screen of the tube 2. Also, preselected ranks may be displayed in place of the deviation values, together with specific deflection yokes matching the ranks.

What is claimed is:

1. A device for measuring eccentricities of tricolor electron beams of a color cathode ray tube, comprising:

control means for controlling each of tricolor electron beam currents of the color cathode ray tube so as to cause each of the tricolor electron beam currents to have current which does not damage a fluorescent screen of the color cathode ray tube;

a video camera for detecting a luminance pattern resulting from impingement of the tricolor electron beams on the fluorescent screen; and image processing means for processing said luminance pattern detected by the video camera to thereby determine eccentricities and eccentric positions of the electron beams;

whereby the eccentricities of the electron beams are measured on the basis of said luminance pattern in a magnetically neutral environment.

2. A device as claimed in claim 1, wherein said control means comprises a beam current control circuit, a bias circuit, and a high-tension power source.

3. A device as claimed in claim 1, wherein said image processing means comprises a computing circuit for determining a center position of each of the tricolor electron beams in terms of a center of gravity of said luminance pattern, and a display for displaying at least one of quality and rank by comparing results of processing and preselected rated values.

* * * * *